United States Patent
Goodnow et al.

(10) Patent No.: US 7,139,881 B2
(45) Date of Patent: Nov. 21, 2006

(54) SEMICONDUCTOR DEVICE COMPRISING A PLURALITY OF MEMORY STRUCTURES

(75) Inventors: Kenneth J. Goodnow, Essex Junction, VT (US); Francis A. Kampf, Jeffersonville, VT (US); Jason M. Norman, South Burlington, VT (US); Sebastian T. Ventrone, South Burlington, VT (US)

(73) Assignee: International Business Machines Corporation, Armonk, NY (US)

( * ) Notice: Subject to any disclaimer, the term of this patent is extended or adjusted under 35 U.S.C. 154(b) by 487 days.

(21) Appl. No.: 10/605,366

(22) Filed: Sep. 25, 2003

(65) Prior Publication Data

US 2005/0071575 A1 Mar. 31, 2005

(51) Int. Cl.
*G06F 12/00* (2006.01)
*G06F 13/16* (2006.01)

(52) U.S. Cl. .................. 711/148; 710/29; 710/112; 711/147; 711/150

(58) Field of Classification Search .............. None
See application file for complete search history.

(56) References Cited

U.S. PATENT DOCUMENTS

| 6,457,100 | B1* | 9/2002 | Ignatowski et al. ......... 711/119 |
| 2002/0054519 | A1* | 5/2002 | Murai et al. ................ 365/200 |
| 2002/0156989 | A1* | 10/2002 | Gaertner et al. ............ 711/207 |
| 2004/0039880 | A1* | 2/2004 | Pentkovski et al. ......... 711/146 |

OTHER PUBLICATIONS

Andrew S. Tanenbaum, Distributed Operating Systems, 1995, Prentice-Hall, pp. 298-301.*

* cited by examiner

*Primary Examiner*—B. James Peikari
(74) *Attorney, Agent, or Firm*—Schmeiser, Olsen & Watts; Anthony Canaile

(57) ABSTRACT

A structure and associated method of transfer data on a semiconductor device, comprising: a plurality of systems within the semiconductor device. Each system comprises at least one processing device and a local memory structure. Each processing device is electrically coupled to each local memory structure within each system. Each local memory structure is electrically coupled to each of the other said local memory structures. Each local memory structure is adapted to share address space with each of the processing devices. Each processing device is adapted to transmit data and instructions to each local memory structure.

22 Claims, 4 Drawing Sheets

SEMICONDUCTOR DEVICE COMPRISING A PLURALITY OF MEMORY STRUCTURES

BACKGROUND OF INVENTION

1. Technical Field

The present invention relates to a structure and associated method to increase a processor to a memory speed in a semiconductor.

2. Related Art

An electronic structure typically comprises a slow access time for signals to travel within the electronic structure. Slow access times decrease overall electronic structure performance thereby making the electronic structure inefficient. Therefore there exists a need to increase access time for signals within an electronic structure to create a more efficient electronic structure.

SUMMARY OF INVENTION

The present invention provides a semiconductor device, comprising:

a plurality of systems within the semiconductor device, each system comprising at least one processing device and a local memory structure, wherein each said processing device is electrically coupled to each said local memory structure within each said system, wherein each said local memory structure is electrically coupled to each of the remaining local memory structures, wherein each said local memory structure is adapted to share address space with each of said processing devices, and wherein each said processing device is adapted to transmit data and instructions to each said local memory structure.

The present invention provides a method for controlling data flow, comprising:

providing a plurality of systems within a semiconductor device, each system comprising at least one processing device electrically coupled to a local memory structure;

electrically coupling each of said local memory structures is to each of the remaining local memory structures;

sharing, by each of said local memory structures, address space with each of the remaining local memory structures; and transmitting, by each said processing device, data and instructions to each said local memory structure.

DETAILED DESCRIPTION

Figure 1:
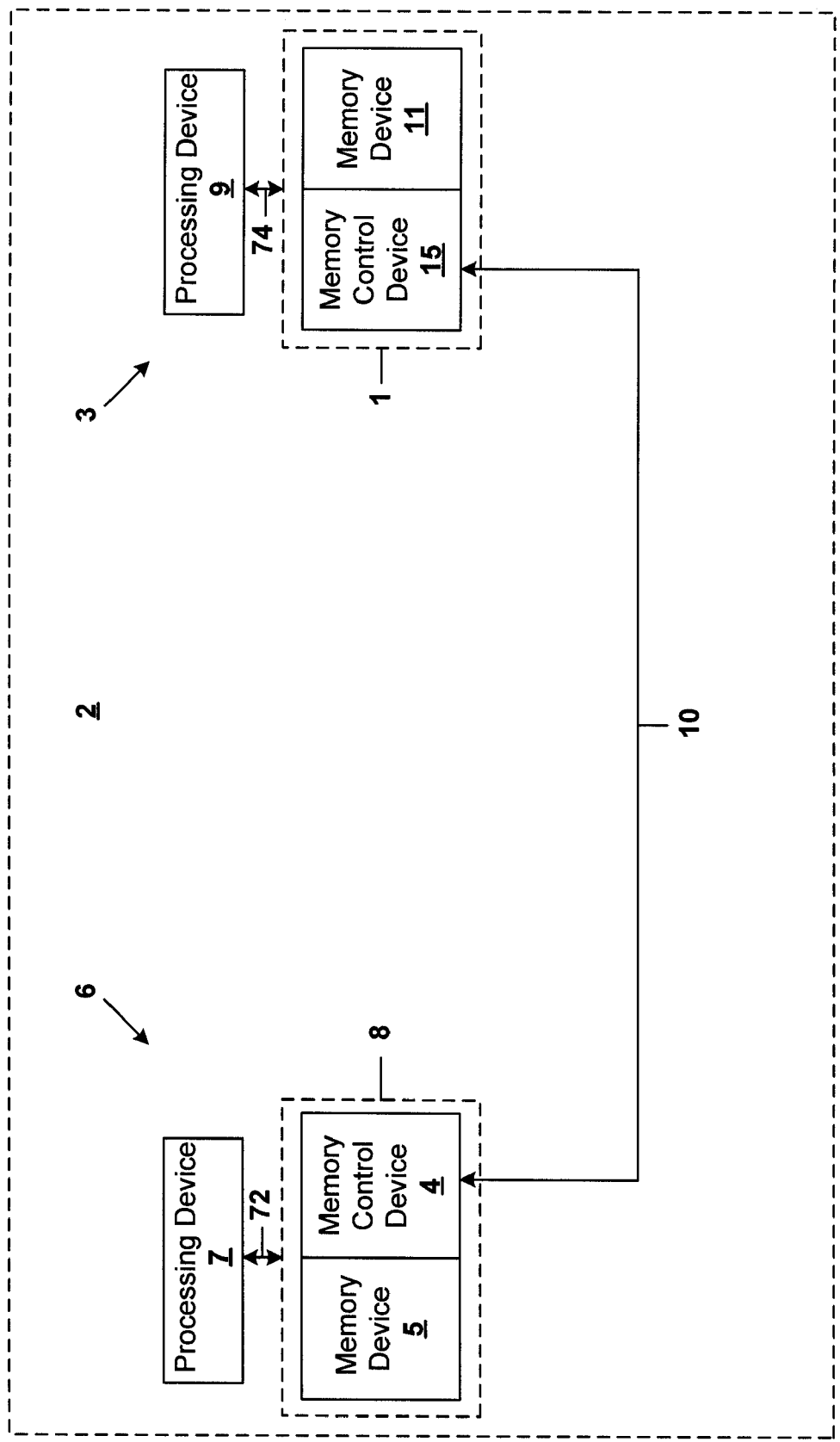
FIG. 1 illustrates a block diagram view of a semiconductor device comprising a first system and a second system, in accordance with embodiments of the present invention.

FIG. 1 illustrates a block diagram view of a semiconductor device 2 comprising a first system 6 and a second system 3, wherein the first system 6 comprises a first processing device 7 and a first local memory structure 8 and wherein the second system 3 comprises a second processing device 9 and a second local memory structure 1 in accordance with embodiments of the present invention. In FIG. 1, the first system 6 and the second system 3 are shown for illustrative purposes and the semiconductor device 8 may comprise a plurality of systems that are equivalent to the first system 6 and/or the second system 3. Furthermore, each of the plurality of systems may comprise a plurality of processing devices as described in detail infra in the description of FIG. 2. The first processing device 7 is electrically coupled to the first local memory structure 8 through a link 72. The second processing device 9 is electrically coupled to the second local memory structure 1 through a link 74. Each of the processing devices 7 and 9 may be proximate but not touching the respective local memory structures 8 and 1 in each of systems 6 and 3. A physical distance that may exist between each processing device 7 and 9 and the respective local memory structure 8 and 1 in each of systems 6 and 3 may be in a range of about 50 microns to about 400 microns. Each of the processing devices 7 and 9 control a plurality of functions on the semiconductor device 2 such as, inter alia, compression, calculations, encryption, decoding, etc. Grouping the processing device 7 with the local memory structure 8 and the processing device 9 with the local memory structure 1 increases an overall speed at which the semiconductor device may function because each of the processing devices 7 and 9 are physically close to each of the memory structures 8 and 1 respectively. The local memory structure 8 in the first system 6 is electrically coupled to the local memory structure 1 in the second system 3 through a link 10. The link 10 may be, inter alia, a high speed serial link.

The high speed serial link may be any high speed serial link known to a person of ordinary skill in the art such as, inter alia, universal serial bus (USB) 1.0 at about 10 Megabits/sec, peripheral component interconnect (PCI) at about 2.5 Gigabits/second. The first local memory structure 8 comprises a memory device 5 coupled to a memory control device 4. The second local memory structure 1 comprises a memory device 11 coupled to a memory control device 15. The memory device 5 comprises a set of data and/or instructions for the processing device 7 so that the processing device 7 may perform the plurality of functions on the semiconductor device 2 as discussed supra. The memory device 11 comprises a set of data and/or instructions for the processing device 9 so that the processing device 9 may perform the plurality of functions on the semiconductor device 2 as discussed supra. The memory device 5 in the first system 6 may comprise a first shared address space adapted to be accessed by both the processing device 7 and the processing device 9. The memory device 11 in the second system 3 may comprise a second shared address space adapted to be accessed by both the processing device 7 and the processing device 9. Additionally, the processing device 7 may access address space in the local memory device 5 that is not shared with the processing device 9 and the processing device 9 may access address space in the local memory device 11 that is not shared with the processing device 7.

Therefore, based upon the shared address space and the non-shared address space, the total amount of addressable space (T) is equal to the shared portion of addressable space (S) added to the product of the unshared addressable space (U) and the number of processing devices (N) in each of the systems 3 and 6 (i.e., T=S+N*U). The preceding feature enables the processing device 7 and the processing device 9 to access a shared set of data and/or instructions from shared memory space in either or both of the memory devices 11 and/or 9. Alternatively, the memory device 5 in the first system 6 may not share any address space with the processing device 9 in the second system 3 and the memory device 11 in the second system 3 may not share any address space with the processing device 7 in the first system 6. The memory control device 4 in system 6 is adapted to control a flow of data and/or instructions between the processing device 7 and/or the memory device 5 and 11. The memory control device 15 in system 3 is adapted to control a flow of data and/or instructions between the processing device 9 and/or the memory device 5 and 11. The first system 6 maintains data coherency (i.e., data is the same) with the second system 3. The memory control device 4 is adapted to send out a message (memory read/write message) to the memory control device 15 anytime the processing device 7 is accessing a memory location in either memory device 5 or memory device 11 if the processing device 9 is trying to access the same memory location in either memory device 5 or memory device 11. The memory control device 15 is adapted to send out a message (memory read/write message) to the memory control device 4 anytime the processing device 9 is accessing a memory location in either memory device 11 or memory device 5 if the processing device 7 is trying to access the same memory location in either memory device 11 or memory device 5. The preceding feature maintains data coherency and prevents the systems 6 and 3 from losing any data and/or instructions for performing any specified functions. Maintaining data coherency will be discussed in further detail, infra, in the description of FIG. 3. Data coherency may be maintained using any protocol known to a person of ordinary skill in the art including, inter alia, a contention protocol, a token passing protocol, a polling protocol, etc. The semiconductor device 2 maybe an integrated circuit (IC). The memory device 8 in each of systems 6 and 3 may be, inter alia, random access memory (RAM), read only memory (ROM), erasable programmable read only memory (EPROM), etc. System 6 may be adapted to transmit a memory write message to system 3 and vice versa. The processing device 9 in each of systems 6 and 3, may be, inter alia, a central processing unit (CPU), a digital signal processor (DSP), etc.

Figure 2:
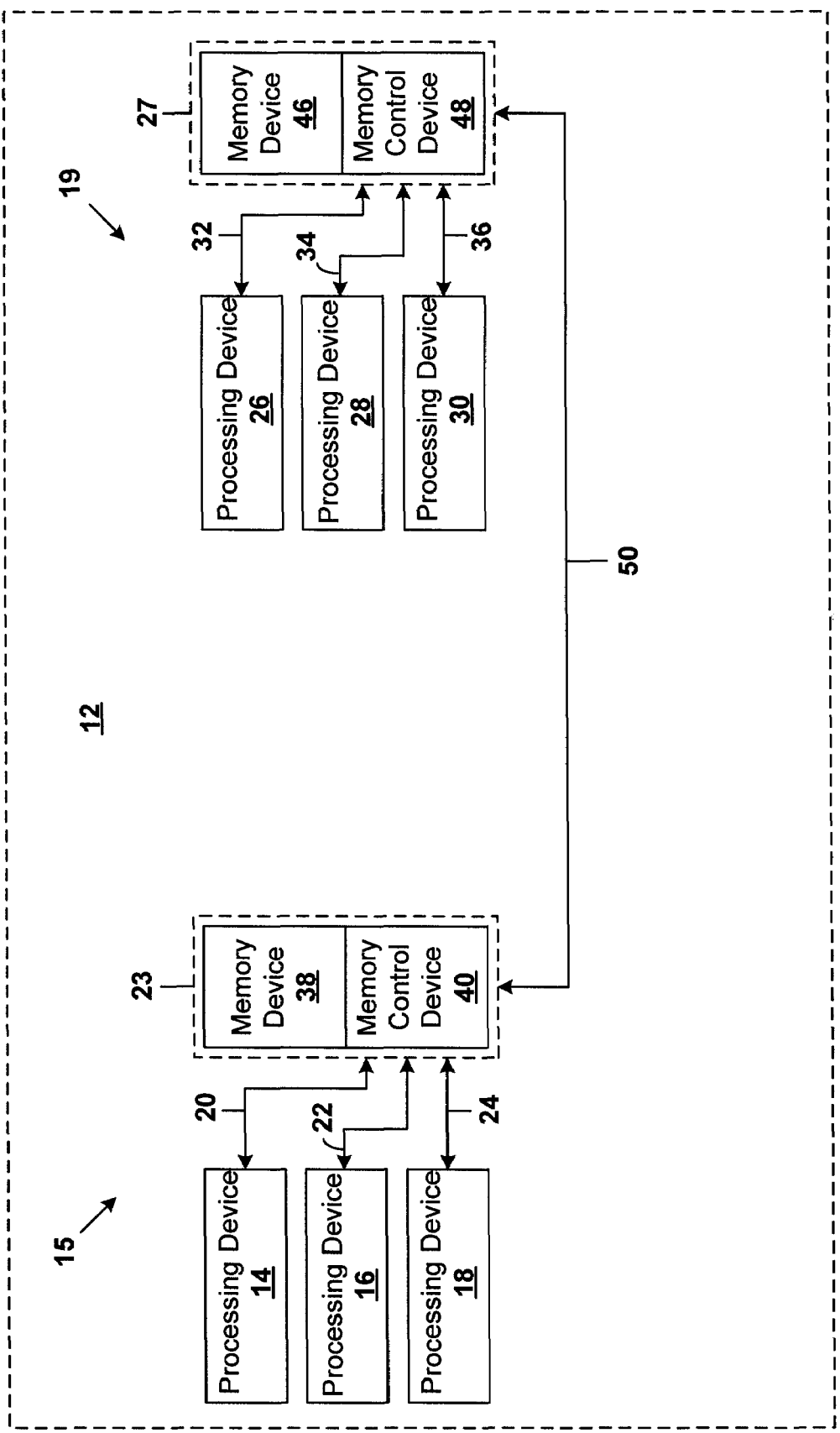
FIG. 2 illustrates an alternative embodiment to FIG. 1, showing a block diagram view of a semiconductor device comprising a plurality of systems, each system comprising a plurality of processing devices, in accordance with embodiments of the present invention.

FIG. 2 illustrates an alternative embodiment to FIG. 1 showing a block diagram view of a semiconductor device 12 comprising a first system 15 and a second system 19, in accordance with embodiments of the present invention. In contrast with FIG. 1, the system 15 comprises a plurality of processing devices 14, 16, and 18 electrically coupled to a local memory structure 23. The memory structure 23 comprises a memory device 38 and a memory control device 40. Each processing device 14, 16, and 18 within the system 15 may perform functions (i.e., functions described, supra, in FIG. 1 description) that are related to each other and require the use of the same memory device 38. Grouping processing devices 14, 16, and 18 that perform similar functions physically close together with the same memory device 38 increases an overall speed at which the semiconductor device may function because each of the processing devices 14, 16, and 18 are physically close to the memory device 38. Similar to the system 15, the system 19 comprises a plurality of processing devices 26, 28, and 30 electrically coupled to a local memory structure 27. The local memory structure 27 is electrically coupled to the local memory structure 23 through a link 50 thereby coupling the first system 15 to the second system 19. The memory structure 27 comprises a memory device 46 and a memory control device 48. Each processing device 26, 28, and 30 within the system 19 may perform functions (i.e., functions described, supra, in FIG. 1 description) that are related to each other and require the use of the same memory device 46. The memory device 38 comprises a set of data and/or instructions for each of the processing devices 14, 16, and 18 50 that each of the processing devices 14, 16, and 18 may perform the plurality of functions on the semiconductor device 12 as discussed supra, in the description of FIG. 1. The memory device 38 in the first system 15 may comprise a first shared address space adapted to be accessed by both the group of processing devices 14, 16, and 18 and the group of processing devices 26, 28, and 30. The memory device 46 in the second system 19 may comprise a second shared address space adapted to be accessed by both the group of processing devices 14, 16, and 18 and the group of processing devices 26, 28, and 30. Additionally, the group of processing devices 14, 16, and 18 may access address space in the local memory device 38 that is not shared with the group of processing devices 26, 28, and 30 and the group of processing devices 26, 28, and 30 may access address space in the local memory device 46 that is not shared with the group of processing devices 14,16, and 18 . Therefore, based upon the shared address space and the non-shared address space, the total amount of addressable space (T) is equal to the shared portion of addressable space (S) added to the product of the unshared addressable space (U) and the number of processing devices (N) in each of the systems 15 and 19 (i.e., T=S+N*U). The preceding feature enables the processing devices 14, 16, and 18 to access a shared set of data and/or instructions from shared memory space in either or both of the memory devices 38 and/or 46. Alternatively, the memory device 38 in the first system 15 may not share any address space with the processing devices 26, 28, and 30 in the second system 19 and the memory device 46 in the second system 19 may not share any address space with the processing devices 14, 16, and 18 in the first system 15. The memory control device 40 in system 15 is adapted to control a flow of data and/or instructions between each of the processing devices 14, 16, and 18 and the memory device 38 through corresponding links 20, 22, and 24. The memory control device 40 maintains data coherency (i.e., data is the same) within the system 15 and between the processing devices 14, 16, and 18 and the memory device 38. The memory control device 40 is adapted to send out a message (i.e., memory read/write message) to each of the processing devices 14, 16, and 18 anytime anyone of the processing devices 14, 16, and 18 are going to access a memory location in the memory device 38 in case anyone of the processing devices 14, 16, and 18 are trying to access the same memory location in the memory device 38. The preceding feature maintains data coherency and prevents anyone of the processing devices 14, 16, and 18 from losing any data and/or instructions for performing any specified functions. Maintaining data coherency will be discussed in further detail, infra, in the description of FIG. 4.

The memory device 46 in the system 19 comprises a set of data and/or instructions for each of the processing devices 26, 28, and 30 so that each of the processing devices 26, 28, and 30 may perform the plurality of functions on the semiconductor device 12 as discussed supra, in the description of FIG. 1. Additionally, the memory device 46 in the second system 19 may be adapted to share address space with the processing devices 26, 28, and 30. The preceding feature enables the processing devices 26, 28, and 30 to access a shared set of data and/or instructions from shared memory space in the memory device 46. The memory control device 48 in system 19 is adapted to control a flow of data and/or instructions between each of the processing devices 26, 28, and 30 and the memory device 46 through corresponding links 32, 34, and 36. The memory control device 48 maintains data coherency (i.e., data is the same) within the system 19 and between the processing devices 26, 28, and 30 and the memory device 46. The memory control device 48 is adapted to send out a message (i.e., memory read/write message) to each of the processing devices 26, 28, and 30 anytime anyone of the processing devices 26, 28, and 30 are going to access a memory location in the memory device 38 in case anyone of the processing devices 26, 28, and 30 are trying to access the same memory location in the memory device 46. The preceding feature maintains data coherency and prevents anyone of the processing devices 26, 28, and 30 from losing any data and/or instructions for performing any specified functions. Maintaining data coherency will be discussed in further detail, infra, in the description of FIG. 4. As with the systems 6 and 3 in FIG. 1, the systems 15 and 19 in FIG. 2 are adapted to maintain data coherency with each other (see description of FIG. 1). Data coherency between processing devices within each system or between systems may be maintained using any protocol known to a person of ordinary skill in the art including, inter alia, a contention protocol, a token passing protocol, a polling protocol, etc.

Figure 3:
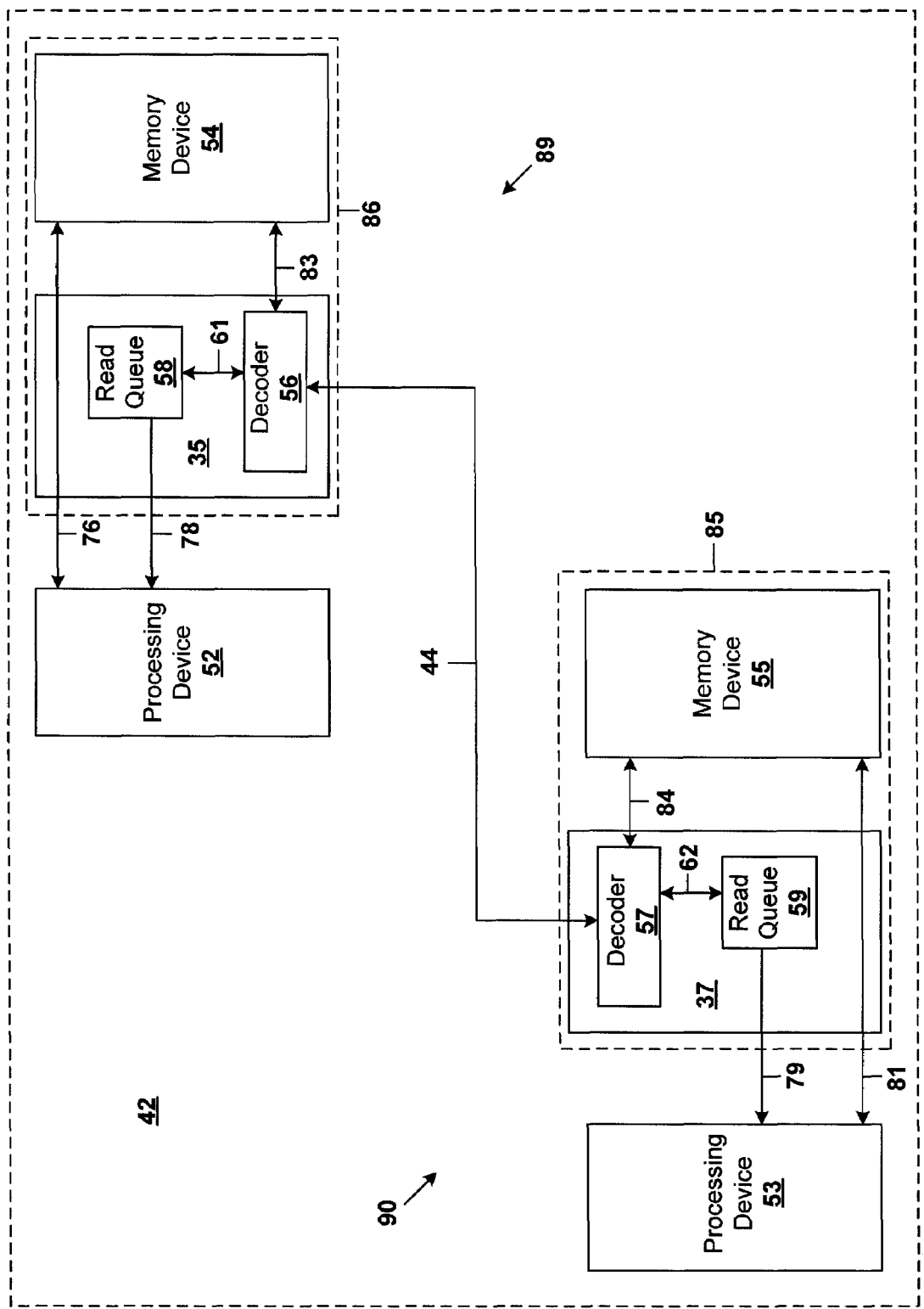
FIG. 3 illustrates an alternative embodiment to FIG. 1, showing a block diagram view of a semiconductor device comprising a plurality of systems, each system comprising a decoder and a read queue, in accordance with embodiments of the present invention.

FIG. 3 illustrates an alternative embodiment to FIG. 1 showing a block diagram view of a semiconductor device 42 (similar to the semiconductor device 2 in FIG. 1) comprising a first system 89 coupled to a second system 90 in accordance with embodiments of the present invention. The system 89 in FIG. 3 comprising a memory structure 86 and a processing device 52 relates to the system 6 in FIG. 1. The system 90 in FIG. 3 comprising a memory structure 85 and a processing device 53 relates to the system 3 in FIG. 1. The memory structure 86 comprises a memory device 54 and a memory control device 35. The memory structure 85 comprises a memory device 55 and a memory control device 37. In contrast with FIG. 1, the memory control device 35 in FIG. 3 comprises a decoder 56 and a read queue 58 and the memory control device 37 in FIG. 3 comprises a decoder 57 and a read queue 59. The decoder 56 is electrically coupled to the decoder 57 through a link 44 (equivalent to the link 10 in FIG. 1) thereby coupling the first system 89 to the second system 90. The system 89 is adapted to maintain data coherency with the system 90 in the event that both of the processing devices 52 and 53 are trying to read or write a shared set of data and/or instructions to a shared memory location in either memory device 54 or memory device 55 at a same time. As a first example, if the processing device 53 is attempting to write data and/or instructions to a first memory location in the memory device 54 at the same time that the processing device 52 is attempting to read the data and/or instructions from the first memory location in the memory device 54, the decoder 56 will send the data and/or instructions to both the memory device 54 through the link 83 and the read queue 58 through the link 61. The processing device 52 will then read the data and/or instructions from the read queue 58 through link 78 instead of from the memory device 54 through link 76. The preceding procedure enables the processing device 52 to read the most current data and/or instructions. The processing device 52 will normally access the memory device 54 through the link 76. As a second example, if the processing device 53 is attempting to write data and/or instructions to a second memory location in the memory device 55 at the same time that the processing device 53 is attempting to read the data and/or instructions from the second memory location in the memory device 55, the decoder 57 will send the data and/or instructions to both the memory device 55 through the link 84 and the read queue 59 through the link 62. The processing device 53 will then read the data and/or instructions from the read queue 59 through link 79 instead of from the memory device 55 through link 81. The preceding procedure enables the processing device 53 to read the most current data and/or instructions. The processing device 53 will normally access the memory device 55 through the link 81.

Figure 4:
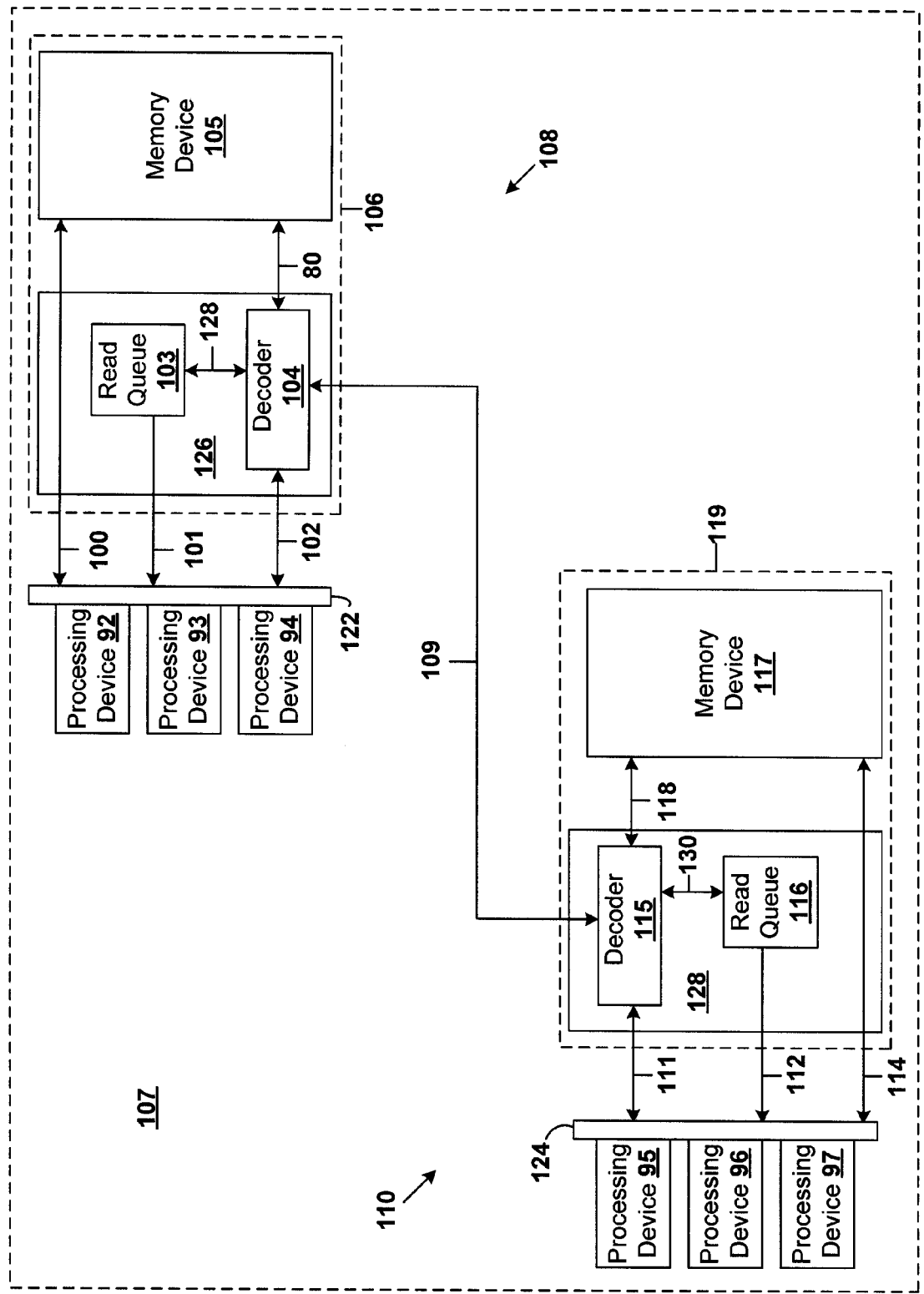
FIG. 4 illustrates an alternative embodiment to FIG. 2, showing a block diagram view of a semiconductor device comprising a plurality of systems, each system comprising a plurality of processing devices coupled to a decoder and a read queue, in accordance with embodiments of the present invention.

FIG. 4 illustrates an alternative embodiment to FIG. 2 showing a block diagram view of a semiconductor device 107 (similar to the semiconductor device 12 in FIG. 2) comprising a first system 108 coupled to a second system 110 in accordance with embodiments of the present invention. The system 108 in FIG. 4 comprising a memory structure 106 and a plurality of processing devices 92, 93, and 94 relates to the system 15 in FIG. 2. The system 110 in FIG. 4 comprising a memory structure 119 and a plurality of processing devices 95, 96, and 97 relates to the system 19 in FIG. 2. The memory structure 106 comprises a memory device 105 and a memory control device 126. The memory structure 119 comprises a memory device 117 and a memory control device 128. In contrast with FIG. 2, the memory control device 126 in FIG. 4 comprises a decoder 104 and a read queue 103, and the memory control device 128 in FIG. 4 comprises a decoder 115 and a read queue 116. The plurality of processing devices 92, 93, and 94 are each individually coupled to links 100, 101, and 102 through a bus structure 122 and the plurality of processing devices 95, 96, and 97 are each individually coupled to links 111, 112, and 114 through a bus structure 124. The decoder 104 is electrically coupled to the decoder 115 through a link 109 (equivalent to the link 50 in FIG. 2) thereby coupling the first system 108 to the second system 110. The system 108 is adapted to maintain data coherency with the system 110 as described supra in the description of FIG. 3. Additionally, the memory control device 126 is adapted to maintain data coherency between the plurality of processing devices 92, 93, and 94 and the memory device 105. For example, if the processing device 92 is attempting to write data and/or instructions to a first memory location in the memory device 105 at the same time that the processing device 93 is attempting to read the data and/or instructions from the first memory location in the memory device 105, the decoder 104 will send the data and/or instructions to both the memory device 105 through the link 80 and the read queue 103 through the link 128. The processing device 93 will then read the data and/or instructions from the read queue 103 through link 101 instead of from the memory device 105 through link 100. The preceding procedure enables the processing device 93 to read the most current data and/or instructions. The processing device 93 will normally access the memory device 105 through the link 100. The aforementioned procedure is applicable for any combination of read/writes between the plurality of processing devices 92, 93, and 94 and the memory device 105 in the system 108. Note that aforementioned procedure relating to the system 108 is applicable for any combination of read/writes between the plurality of processing devices 95, 96, and 97 and the memory device 117 in the system 110.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A semiconductor device, comprising:
a plurality of systems within the semiconductor device, each system comprising at least one processing device and a local memory structure, wherein each said processing device is electrically coupled to each said local memory structure within each said system, wherein each said local memory structure is electrically coupled to each of the remaining local memory structures, wherein each said local memory structure is adapted to share address space with each of said processing devices, wherein each said processing device is adapted to transmit data and instructions to each said local memory structure, wherein each said processing device is further adapted to retrieve data and instructions from each said local memory structure, wherein each said local memory structure comprises a memory device coupled to a memory control device, wherein each said memory control device is adapted to control a flow of said data and instructions between each processing device and each memory device, wherein each said memory device comprises a decoder and a read queue, wherein a decoder in a first system within the plurality of systems is adapted to accept data and instructions from a second system within the plurality of systems and transmit The data to hot a memory device and a read queue in the first system, and wherein a processing device in the first system is adapted to read the data from the read queue of the first system instead of from the memory device of the first system if the second system is transmitting the data to a memory location in the memory device at same time as the processing device is trying to read the data from the memory location.

2. The semiconductor device of claim 1, wherein each of the local memory structures in each said system comprises a first address space that is shared with the processing devices in the other systems, and wherein each of the local memory structures in each said system comprises a second address space that is not shared with the processing devices in any of the other systems.

3. The semiconductor device of claim 1, wherein each said memory device is selected from the group consisting of, random access memory, read only memory, and erasable programmable read only memory.

4. The semiconductor device of claim 1, wherein each said system is adapted to transmit a memory write message to each of other said systems.

5. The semiconductor device of claim 1, wherein each said local memory structure is electrically coupled to each of the remaining local memory structures with a high speed serial link.

6. The semiconductor device of claim 5, wherein each high speed serial link is selected from the group consisting of a universal serial bus (USB) and a peripheral component interconnect (PCI).

7. The semiconductor device of claim 1, wherein a physical distance between each said processing device and each said local memory structure within each said system is in a range of about 50 microns to about 400 microns.

8. The semiconductor device of claim 1, wherein each said processing device is selected from the group consisting of a central processing unit and a digital signal processor.

9. The semiconductor device of claim 1, wherein the plurality of systems is adapted to maintain data coherency between each of said memory structures and each of said processing devices.

10. The semiconductor device of claim 9, wherein said data coherency is maintained using a protocol selected from the group consisting of contention, token passing, and polling.

11. A semiconductor device, comprising:
a plurality of systems within the semiconductor device, each system comprising a plurality of processing devices and a local memory structure, wherein each processing device of each said plurality of processing devices is electrically coupled to each said local memory structure within each said system, wherein each said local memory structure is electrically coupled to each of the remaining local memory structures, wherein each said local memory structure is adapted to share address space with each of said processing devices, wherein each said processing device is adapted to transmit data and instructions to each said local memory structure, wherein each local memory structure comprises a memory device coupled to a memory control device, and wherein the memory control device is adapted to control a flow of said data and instructions between each of the plurality of processing devices and each said memory device, wherein each memory control device in each system comprises a decoder and a read queue, wherein the decoder is adapted to accept data and instructions from a first processing device within the plurality of processing devices within a system and transmit the data and instructions to both the memory device and the read queue in the system, wherein a second processing device in the system is adapted to read the data and instructions from the read queue instead of the memory device if the first processing device is transmitting the data and instructions to a memory location in the memory device at same time as the second processing device is trying to read the data and instructions from the memory location.

12. A method for controlling data flow, comprising:
providing a plurality of systems within a semiconductor device, each system comprising at least one processing device electrically coupled to a local memory structure;
electrically coupling each of said local memory structures to each of the remaining local memory structures;
sharing, by each local memory structure in each said system, address space with each of the processing devices in each of the other systems;
transmitting by each said processing device data and instructions to each said local memory structure;
retrieving by each said processing device data and instructions from each said local memory structure, wherein each local memory structure comprises a memory device coupled to a memory control device;
controlling, by each said memory control device, a flow of data and instructions between each processing device and each memory device, wherein each memory device comprises a decoder and a read queue;
accepting, by a decoder in a first system within the plurality of systems, data and instructions from a second system within the plurality of system; and
transmitting, by the decoders the data and instructions to both a memory device and a read queue in the first system, wherein a processing device in the first system is adapted to read the data and instructions from the read queue instead of the memory device if the second system is transmitting the data and instructions to a memory location in the memory device at same time as the processing device is trying to read the data and instructions from the memory location.

13. The method of claim 12, wherein each of the local memory structures in each said system comprises a first address space that is shared with the processing devices in the other systems, and wherein each of the local memory structures in each said system comprises a second address space that is not shared with the processing devices in any of the other systems.

14. The method of claim 12, wherein each said memory device is selected from the group consisting of, random access memory, read only memory, and erasable programmable read only memory.

15. The method of claim 12, further comprising;
transmitting, by each said system, a memory with message to each of other said systems.

16. The method of claim 12, wherein each said local memory structure is electrically coupled to each of other said local memory structures with a high speed serial link.

17. The method of claim 16, wherein each high speed serial link is selected from the group consisting of a universal serial bus (USB) and a peripheral component interconnect (PCI).

18. The method of claim 12, wherein a physical distance between each said processing device and each said local memory structure within each said system is in a range of about 50 microns to about 400 microns.

19. The method of claim 12, wherein each said processing device is selected from the group consisting of a central processing unit and a digital signal processor.

20. The method of claim 12, wherein each system comprises a plurality of processing devices electrically coupled to each said local memory structure within each said system.

21. A method for controlling data flow, comprising:
providing a plurality of systems within a semiconductor device, each system comprising at least one processing device electrically coupled to a local memory structure;
electrically coupling each of said local memory structures to each of the remaining local memory structures;
sharing, by each local memory structure in each said system, address space with each of the processing devices in each of the other systems;
transmitting, by each said processing device, data and instructions to each said local memory structure;
maintaining, by the plurality of systems, data coherency between each of said memory structures and each of said processing devices, wherein each sai9 local memory structure comprises a memory device coupled to a memory control device;
controlling, by each said memory control device, a flow of data and instructions between each of the plurality of processing devices and each memory device within each system, wherein each memory control device in each system comprises a decoder and a read queue;
accepting, by a decoder in a first system within the plurality of systems, data and instructions from a processing device within the plurality of processing devices in the first system within the plurality of systems;
transmitting by the decoder the data and instructions to both the memory device and the read queue in the system; and
reading by a second processing device in the system the data and instructions from the read queue instead of the memory device if the first processing device is transmitting the data and instructions to a memory location in the memory device at same time as the second processing device is trying to read the data and instructions from the memory location.

22. The method of claim 21, wherein said data coherency is maintained using a protocol selected from the group consisting of contention, token passing, and polling.

* * * * *